United States Patent [19]
Aboaf et al.

[11] 4,325,733
[45] Apr. 20, 1982

[54] AMORPHOUS CO-TI ALLOYS

[75] Inventors: Joseph A. Aboaf, Peekskill, N.Y.; Erik Klokholm, Stamford, Conn.

[73] Assignee: International Business Machines Corporation, Armonk, N.Y.

[21] Appl. No.: 108,113

[22] Filed: Dec. 28, 1979

[51] Int. Cl.³ .............................................. C22C 19/00
[52] U.S. Cl. .................................. 75/170; 75/123 K; 75/123 M; 75/134 F
[58] Field of Search ................ 75/170, 123 K, 123 M, 75/134 F, 175.5

[56] References Cited

U.S. PATENT DOCUMENTS

| | | | |
|---|---|---|---|
| 3,358,369 | 1/1971 | Wang et al. | 148/11.5 |
| 4,011,075 | 3/1977 | Watanabe et al. | 75/170 |
| 4,116,682 | 9/1978 | Polk et al. | 75/170 |
| 4,152,144 | 5/1979 | Hasegawa et al. | 75/123 K |
| 4,187,128 | 2/1980 | Billings et al. | 148/121 |
| 4,225,339 | 9/1980 | Inomata et al. | 75/134 F |
| 4,255,189 | 3/1981 | Ray | 75/123 M |

OTHER PUBLICATIONS

Ray et al., "The Constitution of Metastable Titanium-Rich Ti-Fe Alloys: An Order-Disorder Transition," *Metallurgical Transactions* 3, 627–629 (Mar. 1972).
Brunsch, "Magnetic Properties and Corrosion Resistance of $(CoFeB)_{100-x} Cr_x$ Thin Films", Joint Intermag MMM Conference, New York 1979.

*Primary Examiner*—John P. Sheehan
*Attorney, Agent, or Firm*—Graham S. Jones, II

[57] ABSTRACT

An amorphous alloy of cobalt and from about 14 to 30 atomic percent of titanium can be deposited upon a substrate by r.f. sputtering from 10 to 30 percent of titanium. The properties of the amrophous CoTi films are similar to those of transition metal-metalloid glasses in that they have soft magnetic properties (low $H_c$) and their resistivity is in the 100–200 micro-ohm centimeter range. Unlike most metal-metalloid glasses, these films have very low magnetostriction and they are more stable to thermal annealing. They are more corrosion resistant than permalloy plated films. The films can be employed as magnetic yoke layers in magnetic recording heads or in the bubble propagation structures of bubble domain devices, as substitutes for 80:20 Ni:Fe alloys. The FeCoTi, NiCoTi and FeNiCoTi amorphous alloys have similar characteristics to the CoTi amorphous alloys for Ti concentrations on the order of 14 to 30 atomic percent where the ratio of Co to Fe and or Ni is greater than or equal to about 1 to 1.

13 Claims, 14 Drawing Figures

FIG. 5.1
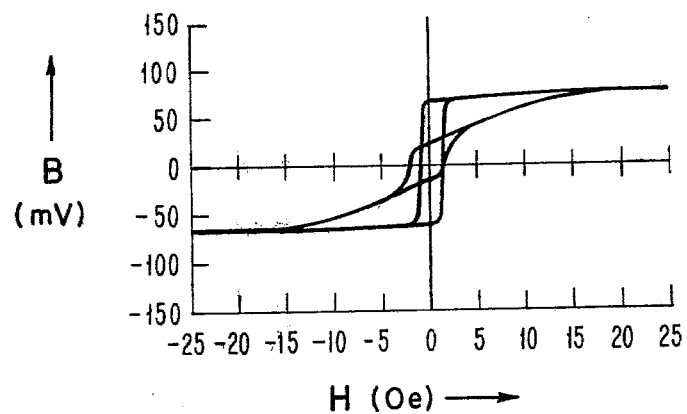
FIG. 5.2
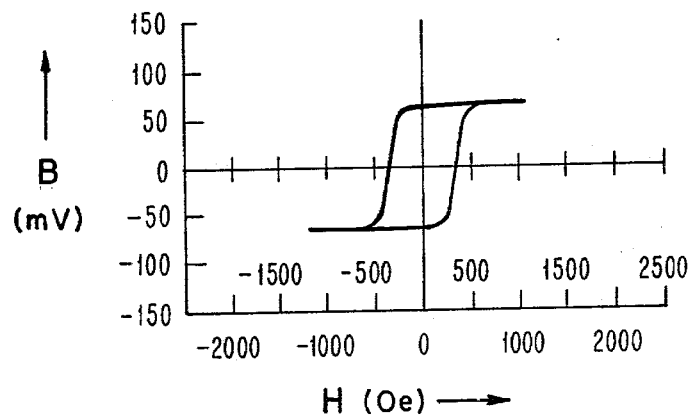

FIG. 6.1
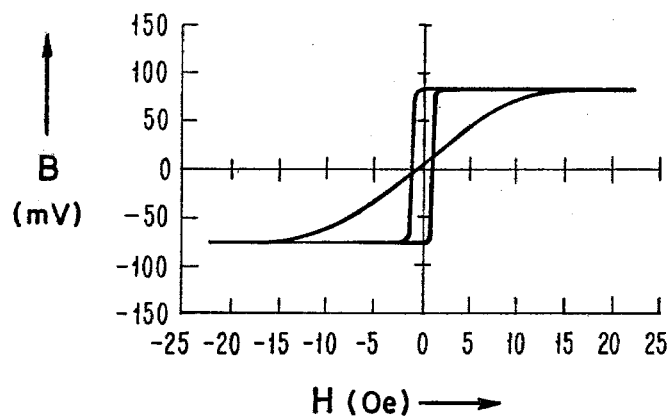
FIG. 6.2
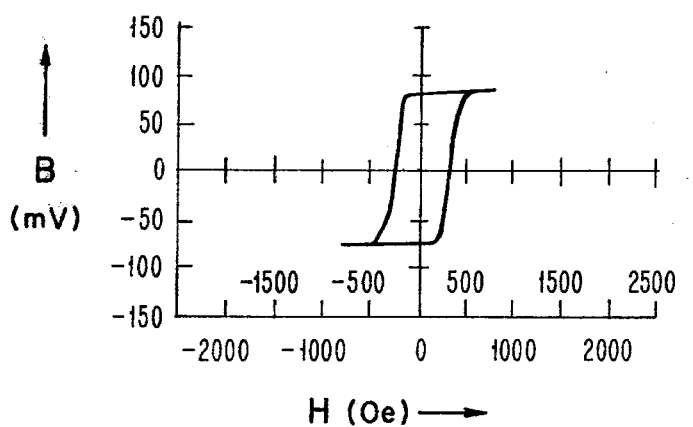

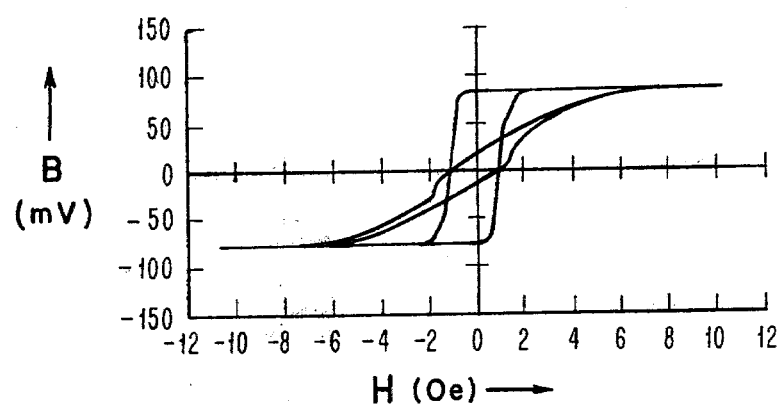
FIG. 7.1
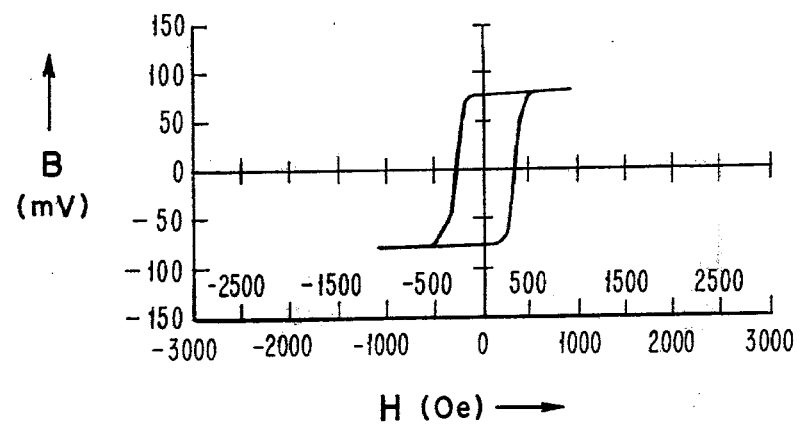
FIG. 7.2

AMORPHOUS CO-TI ALLOYS

DESCRIPTION

1. Technical Field

This invention relates to thin film alloys of amorphous materials and more particularly to magnetic amorphous thin films having advantageous magnetic properties.

2. Background Art

Magnetic glasses in ribbon form consisting of one or more transition elements alloyed with metalloids such as B, P, and C have attractive magnetic as well as mechanical properties and were reviewed recently by F. E. Luborsky, J. of Magnetism and Magnetic Materials, 7, 143 (1978). Amorphous magnetic thin films have been deposited by vapor deposition techniques and their properties found to be similar to those of bulk glassy ribbons, R. J. Kobliska, J. A. Aboaf, A. Gangulee, J. J. Cuomo and E. Klokholm, Appl. Phys. Letters, 33(5), 1 (1978). They have soft magnetic properties and high resistivity. The magnetostriction of FeB amorphous films is high, J. A. Aboaf and E. Klokholm, International Conf. on Magnetism and Magnetic Materials, Munich 1979, Abstract 1Z-13. That of CoFeB alloys is close to zero. These alloys have poor corrosion properties unless they contain Cr in large amounts, A. Brunsch, Joint Intermag-MMM Conference, New York (1979). FeSi films are corrosion resistant, V. Brusic, R. D. MacInnes, and J. A. Aboaf, Passivity of Metals, R. P. Frankenthal and J. Kruger, p. 170 (1978). However, FeSi films are thermally unstable at 250° C., J. A. Aboaf, R. J. Kobliska and E. Klokholm, IEEE Trans. on Magnetics, MAG-14, 5, 941 (1978).

U.S. Pat. No. 4,011,075 of Watanabe et al for "Materials for Tamping Battery Mix" describes a Co-Ti binary alloy or intermetallic compound which is corrosion resistant to a battery mix. The Ti content is 40–60% to avoid a brittle intermetallic compound which is precipitated below 40 atomic percent Ti. No mention of amorphous alloys or magnetic characteristics of the composition is made.

U.S. Pat. No. 3,558,369 of Wang et al for "Method of Treating Variable Transition Temperature Alloys" describes $TiCo_xFe_{1-x}$ alloys which are preferred for their mechanical characteristics but which are not indicated to possess special magnetic characteristics. The TiCo alloys are indicated to be crystalline with a complex crystal structure. The percentage of Ti in the alloy is about 50 atomic percent and the percentage of Fe and Co varies between 0 and 50% of the alloy for each.

R. Bay, B. C. Giessen and N. J. Grant, "The Constitution of Metastable Titanium-Rich Ti-Fe Alloys: An Order-Disorder Transition," *Metallurgical Transactions* 3, 627–629 (March 1972) describe noncrystalline phases of Ti-Fe alloys made by splat cooling and on page 629 mention Ti-Co splat quenched alloys described in a thesis by R. Ray at MIT with larger Ti contents. No mention is made of magnetic characteristics in the article.

BRIEF DESCRIPTION OF THE DRAWINGS

FIG. 5.1 is a set of B-H loops for a CoTi alloy showing both the hard and easy axis loops.

FIG. 5.2 is a B-H loop of the same alloy showing the easy axis loop.

FIG. 6.1 is a B-H loop similar to FIG. 5.1 for the same alloy after it has been annealed in the easy axis direction.

FIG. 6.2 is a B-H loop for the easy axis direction of the material of FIG. 6.1.

FIG. 7.1 is a set of B-H loops similar to 6.1 for hard axis annealing.

FIG. 7.2 is an easy axis loop for the material of FIG. 7.1.

DISCLOSURE OF THE INVENTION

The alloys of this invention are amorphous and for many compositions, the alloys are magnetic. The alloys have been prepared by means of r.f. sputter deposition of alloys of cobalt, titanium and selected compositions of nickel and iron. Unlike other cobalt titanium alloys, the content of the titanium in all of the alloys of this invention is less than about 30% which is generally where the upper limit exists, above which the alloy is no longer magnetic.

The films of this invention adhere very well to a substrate such as silicon or glass slides even after annealing in argon at 450° C. The stress in the films is compressive, $-2 \times 10^9$ dynes/cm$^2$ and becomes slightly tensile upon annealing at 300° C. in argon for CoTi alloys produced by the process described below. X-ray diffraction analysis shows that CoTi films are generally amorphous when the films have a titanium content in excess of about 14 atomic percent.

COBALT-TITANIUM ALLOYS

Figure 1:
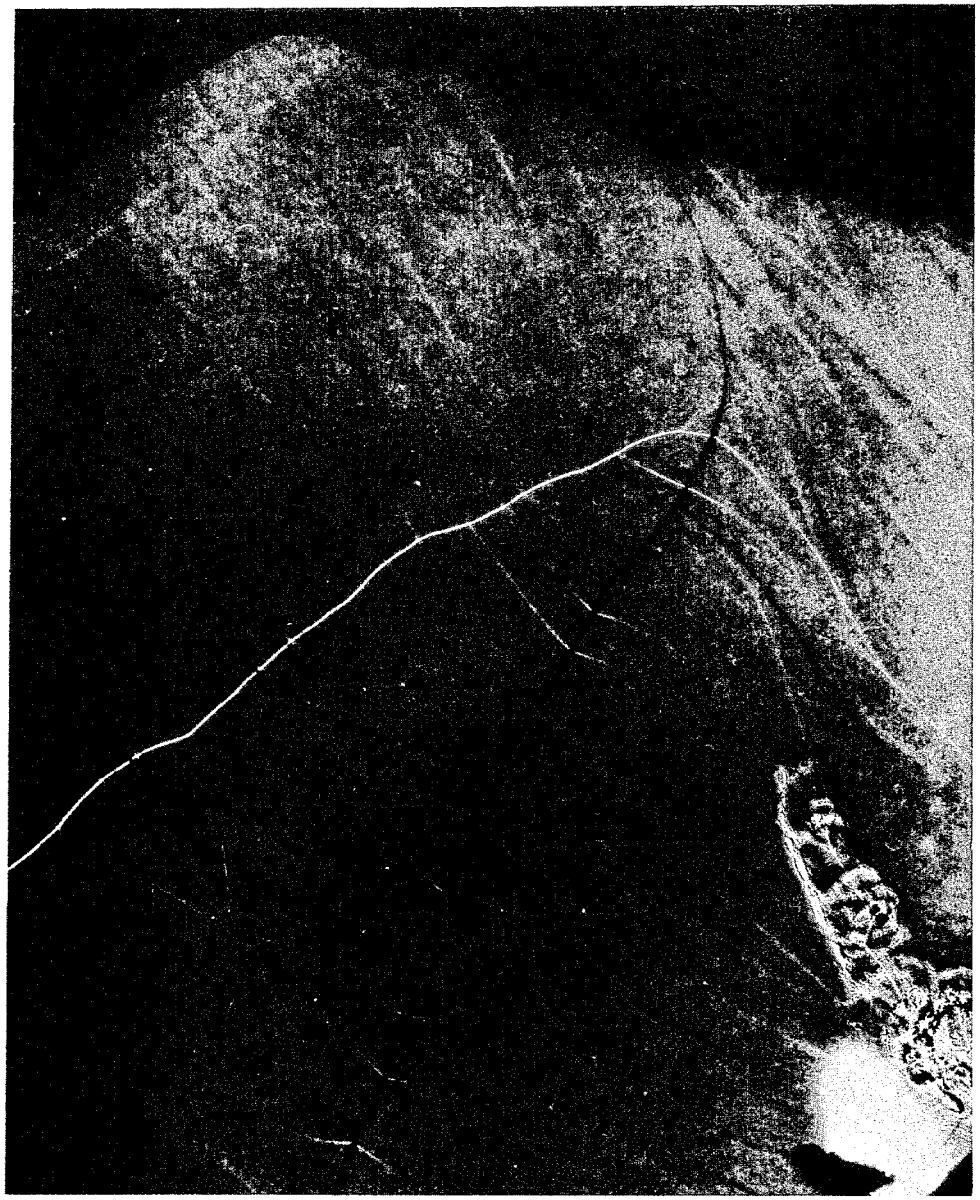
FIG. 1 is a photograph of a Lorentz microscope projection of a domain structure of an amorphous film of CoTi in accordance with this invention.

FIG. 1 ia a photograph showing a typical domain structure of a 1000 Angstrom thick $Co_{82.7}Ti_{17.3}$ film deposited upon a NaCl single crystal and studied by Lorentz microscopy. The domain structure of this amorphous CoTi film is essentially identical to that of permalloy (Ni:Fe 80:20).

Figure 2:
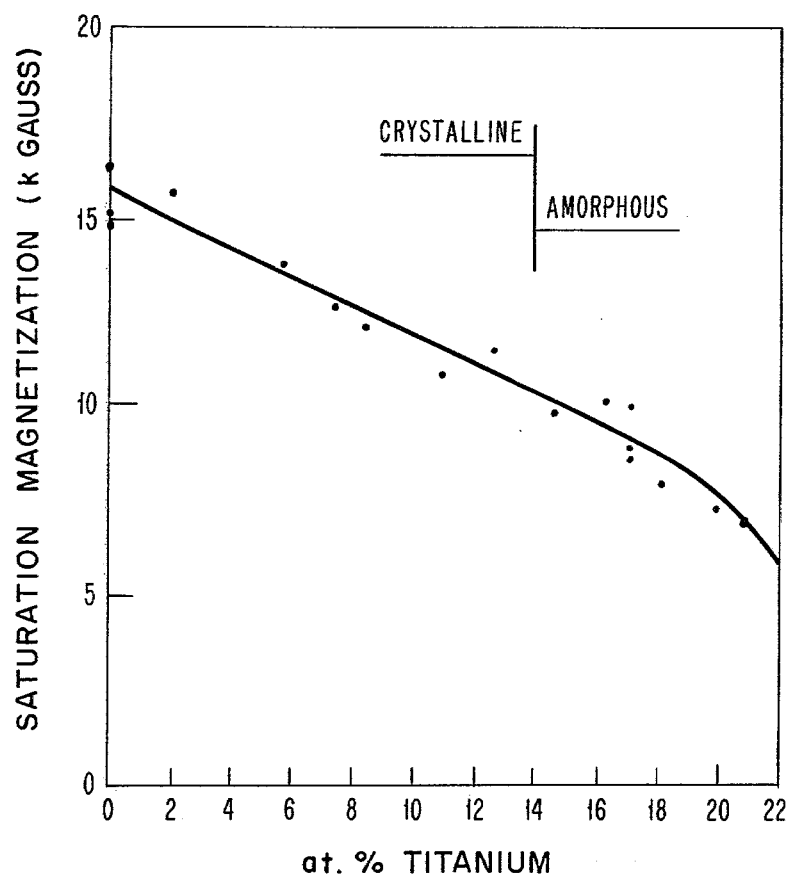
FIG. 2 is a graph of saturation magnetization of Co-Ti alloys as a function of Ti concentration.

FIG. 2 shows the variation of saturation magnetization (4πM) as a function of titanium concentration in the alloy. As amorphous films can be deposited at room temperature for a titanium content in the film of over about 14 atomic percent, the maximum saturation magnetization of an amorphous film of this variety is on the order of 11,000 gauss which is the value in FIG. 2 for 14% Ti.

Figure 3:
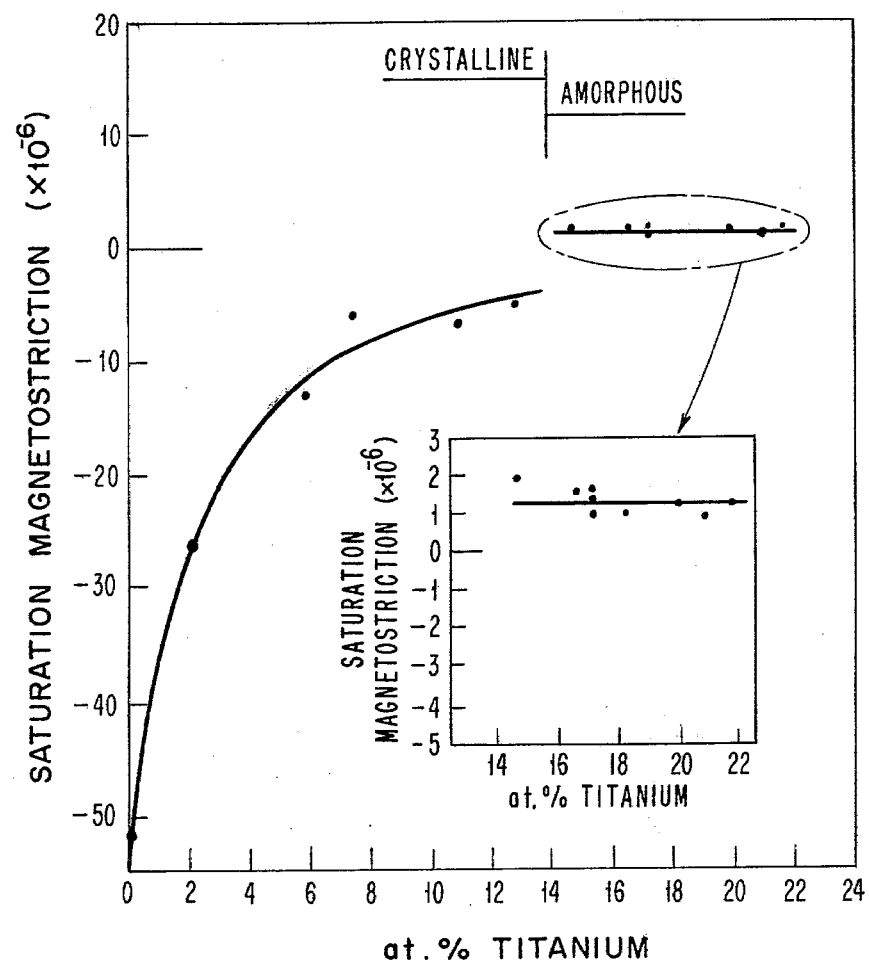
FIG. 3 is a graph of saturation magnetostriction of CoTi alloys as a function of Ti concentration in the alloy.

FIG. 3 shows the saturation magnetostriction for the same CoTi crystalline and amorphous alloys which shows a discontinuity in the crystalline to amorphous transformation range about the 14% Ti level of the alloy. The measurements were made at room temperature. The magnetostriction of all amorphous CoTi films was found to be about $+1 \times 10^{-6}$. Thus, it appears that the magnetostriction of amorphous CoTi is not sensitive to the chemical composition of the films. Such a small value of magnetostriction is advantageous for use in magnetic recording to reduce noise caused by mechanical forces which cause changes in anisotropy, as well as increases in coercivity through reorientation of magnetic ions in the films. The saturation magnetostriction varies between $-51 \times 10^{-6}$ (pure cobalt) to $-5 \times 10^{-6}$ for the crystalline CoTi alloys. The magnetostriction of amorphous CoTi alloys is positive ($\approx +1 \times 10^{-6}$) and does not change with composition from 14 to 22 atomic percent.

Figure 4:
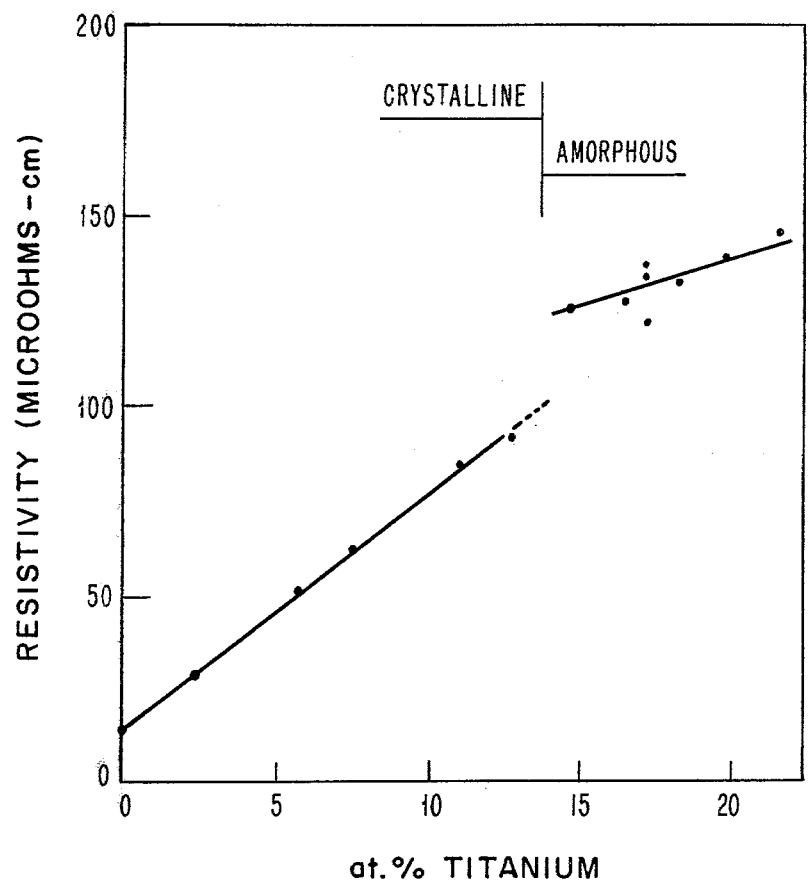
FIG. 4 is a graph of resistivity of CoTi alloys as a function of Ti concentration in the alloys.

FIG. 4 shows the resistivity of the CoTi alloys as a function of Ti concentration. Here again, there is a discontinuity of the resistivity at about 14% titanium in the alloy, where the crystalline-amorphous transition occurs. The resistivity of the amorphous film is on the order of 130-micro-ohms-cm. This is much higher than the resistivity of permalloy films (80:20 Ni:Fe) which have a value on the order of 15 micro-ohms-cm. They provide high permeability films at high frequencies through the reduction of eddy current losses.

The B-H loops of the as-deposited amorphous (2500 Å thick film) $Co_{81.8}Ti_{18.2}$ film are shown in FIGS. 5.1 and 5.2. FIG. 5.1 shows an in-plane anisotropy where the nonsquare hard axis loop saturates at about 15 Oe. In FIG. 5.2, the easy axis loop is shown with less saturation than in FIG. 5.1 and the distance along the H axis from the origin is 0.3 for a coercivity of 0.3 Oe. Annealing the film at 250° C. for one hour under the influence of a field in the easy axis direction yields an anisotropy of 12 Oe in FIG. 6.1 and a coercivity of 0.3 Oe in FIG. 6.2. The coercivity and anisotropy are reduced slightly. A subsequent one hour annealing in the hard axis direction substantially reduces the anisotropy yielding an anisotropy of 6 Oe and a coercivity of 0.3 which is unchanged as shown in FIGS. 7.1 and 7.2. Such behavior is very similar to that obtained for permalloy films.

The stability of the magnetic characteristics of the amorphous films was checked by annealing the films in argon for 30 minutes at successively increasing temperatures in 50° C. increments form 200° to 450° C. The results show that the films are thermally stable up to about 400°-450° C. Table I shows that the coercivity of the films tested increased rapidly within that range, most probably because of crystallization. Table I shows the coercivity and saturated anisotropy field of two alloys of CoTi as indicated compared to sputtered permalloy. The coercivity of the CoTi amorphous alloys is stable up to 400° C. while that of permalloy is stable up to 350° C.

The corrosion resistance of CoTi films is dependent upon the titanium concentration and its structure as shown in Table II. For amorphous alloys, the corrosion rate (weight increase) in the atmosphere (described by Rice, Suits and Lewis in the Journal of Applied Physics 47 1158 (1976)) varies from 0.13 to 0.03 microgram/cm²/hour for titanium concentrations ranging from 14 to 22 atomic percent. The amorphous films are shown to be at least 2.5 times more corrosion resistant than permalloy plated films. In the same conditions, the increase in weight for plated permalloy films is 0.24 micrograms/cm²/hour.

TABLE I

Coercivity ($H_c$) and Anisotropy Field ($H_k$) of Films After Successive Annealings at Different Temperatures

|  | $Co_{83}Ti_{17}$ | | $Co_{79}Ti_{21}$ | | Permalloy | |
| --- | --- | --- | --- | --- | --- | --- |
|  | $H_c$ | $H_k$ | $H_c$ | $H_k$ | $H_c$ | $H_k$ |
| As deposited | 0.3 | 20 | 0.3 | 15 | 1.0 | 10 |
| Annealed at 200° C. | 0.25 | 15 | 0.25 | 19 | 0.9 | 7.2 |
| Annealed at 250° C. | 0.2 | 15 | 0.25 | 19 | 0.8 | 7.2 |
| Annealed at 300° C. | 0.25 | 15 | 0.25 | 19 | 0.4 | 7.2 |
| Annealed at 350° C. | 0.3 | 14 | 0.25 | 8 | 0.4 | 3.8 |
| Annealed at 400° C. | 0.45 | 14 | 0.35 | 8 | 1.1 | 6.8 |
| Annealed at 450° C. | 19.0 | 30 | 0.8 | 8 | 1.7 | 6.4 |

TABLE II

| Alloy | Corrosion Test $\mu g/cm^2$ - 375 Hrs. |
| --- | --- |
| Crystalline $Co_{91.5}Ti_{8.5}$ | 844 |
| Crystalline $Co_{87.3}Ti_{12.7}$ | 1102 |
| Amorphous $Co_{82.7}Ti_{17.3}$ | 35 |
| Amorphous $Co_{79}Ti_{21}$ | 15 |
| Plated Permalloy | 85 |

ALTERNATIVE COTI ALLOYS WITH NI AND FE

Alternative alloy compositions which provide the desirable amorphous alloys include from about 14 to about 30 percent of Ti with Co which can be no less than a 50% concentration with at least one other element selected from the group consisting of Fe and Ni. In other words, the alloy can include $(Co_{40+Fe_x}Ni_y)_{100-z}Ti_z$ where z is less than or equal to about 30 and greater than or equal to about 14 and x+y is less than or equal to about 60.

Table III shows the values of coercivity $H_c$ and saturation anisotropy field for various FeCoTi alloys with $[Fe_{47.9}Co_{52.1}]Ti_x$ and with x=7.8, 12.4, 14.3 or 15.6.

TABLE III

|  | $FeCoTi_{7.8}$ | | $FeCoTi_{12.4}$ | | $FeCoTi_{14.3}$ | | $FeCoTi_{15.6}$ | |
| --- | --- | --- | --- | --- | --- | --- | --- | --- |
|  | $H_c$ | $H_k$ | $H_c$ | $H_k$ | $H_c$ | $H_k$ | $H_c$ | $H_k$ |
| As dep. |  | ⊥600 |  | ⊥700 |  | ⊥120 |  | ⊥120 |
| Annealed at |  |  |  |  |  |  |  |  |
| 200° C. |  | ⊥600 |  | ⊥700 |  | ⊥25 |  | ⊥70 |
| 250° C. |  | ⊥600 |  | ⊥700 | 0.2 | 23 | 0.15 | 20 |
| 300° C. | ⊥ |  |  | ⊥700 | 0.25 | 25 | 0.2 | 18 |
| 350° C. | ⊥ |  |  | ⊥700 | 0.3 | 23 | 0.2 | 15 |
| 400° C. | ⊥ |  |  | ⊥700 | 0.5 | 23 | 0.4 | 15 |

The symbol ⊥ refers to the perpendicular anisotropy (see Appl. Phys. Lett. 33(5), 1 (1978), supra). Upon annealing, the B-H loop shows an in-plane anisotropy. As to the symbol ⊥$_a$, e.g., ⊥$_{600}$ where "a" equals 600, the value "a" refers to the field necessary to saturate the specimen in Oersteds, i.e., 600, 700, 120, 25 and 70 Oersteds, which are the values in Table III. Cobalt and cobalt alloy films have been deposited by r.f. sputtering using a system previously described, Aboaf, Klokholm and Kobliska, supra.

FILM SPUTTERING

In particular, the water cooled 6" diameter cathode target is made of a copper plate on which a 70 micron thick pure plate of cobalt has been mounted. Triangular shaped segments made of 20 mils thick are positioned on the cobalt plate, their base held by springs on the outer circumference of the plate and their apex under a cobalt screw mounted in the center of the plate. The anode is water cooled and can be rotated. The anode can also be heated. Metal alloy films were sputtered on 1" diameter thermally oxidized silicon wafers. The chamber is typically evacuated to $1\times10^{-6}$ torr. High purity argon is introduced in the system and the pressure controlled at 20 millitorr. With a shutter covering the substrate holder, the segmented target is pre-sputtered for an hour to clean its surface and help getter the system of background impurities. The substrates are then exposed to the incident flux. Both pre-sputtering and sputtering are done for the same predetermined conditions: 1000 volt cathode bias and $-50$ volt anode bias. The rotating substrate holder (60 r.p.m.) assures the circumferential composition uniformity of the deposited film.

CHARACTERIZATION OF FILMS

The thickness of the films was measured in the center of the wafer using a mechanical surface profile meter. The accuracy is limited by the thickness uniformity of the sample which can be in one case as large as 30% from one edge of the sample to the other. The chemical composition of alloy films, typically 3000 Å thick, was measured by electron microprobe. The magnetic properties were measured using an inductive loop tracer which displayed the B vs. H curve directly on an oscilloscope. The saturation magnetization at room temperature was measured at high fields from the B–H loop. The instrument was calibrated by measuring the saturation magnetization of several samples using a force balance magnetometer. The coercivity $H_c$ was obtained from the easy axis hysteresis loop; the saturation anisotropy field $H_k$, by extrapolating the hard axis loop at small drive fields to the saturation magnetization value. The resistivity measurements were made at room temperature using a four point probe. Magnetostriction measurements were made at room temperature using the apparatus developed by E. Klokholm, IEEE Trans. MAG-12 6 (1976).

RESULTS AND DISCUSSION

Sputtering of Alloys: The results reported here are for sputter depositions made in 20 microns argon pressure at a $-50$ volt anode bias and 1000 volts cathode potential. The composition of the films from 5 to 24 atom percent titanium is linear as a function of the cathode area coverage by titanium triangular segments. Once the system is calibrated, various compopositions can be obtained reproducibly. The uniformity of the chemical composition of the deposited films is constant within the precision of the electron microprobe analysis (accuracy $\pm2\%$ for cobalt and titanium). The deposition rate of the films is about 50 angstroms per minute.

COBALT-IRON-TITANIUM ALLOYS

Figure 8:
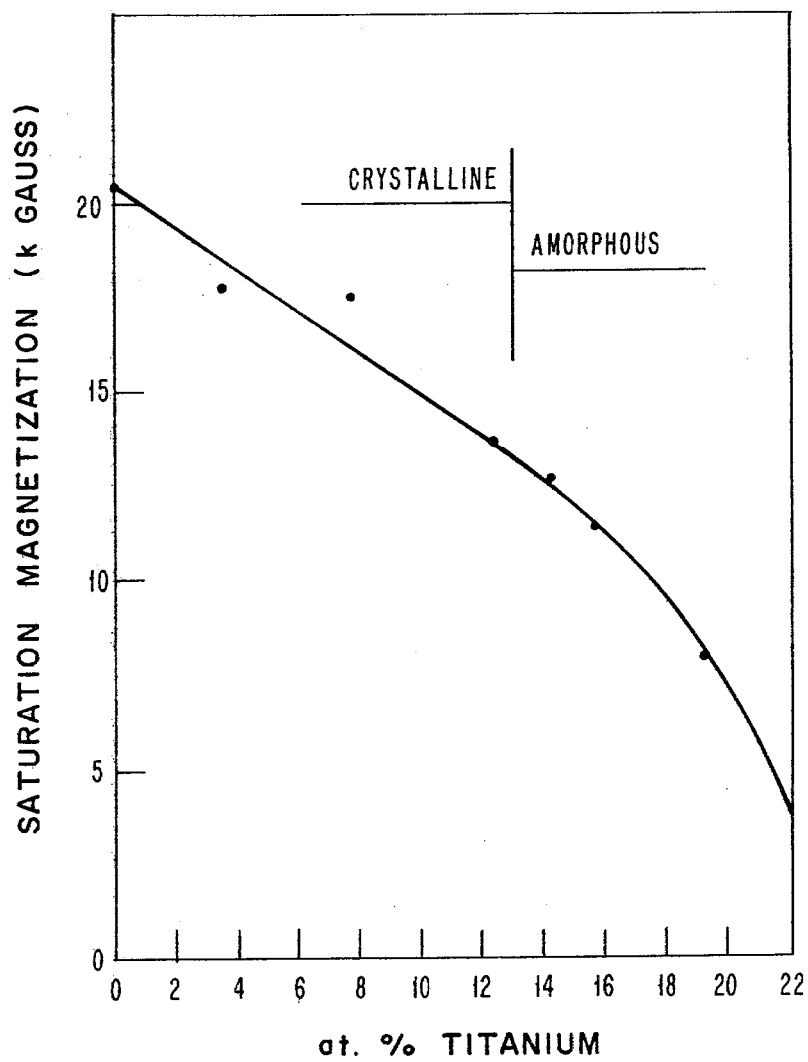
FIG. 8 is a graph of the saturation magnetization of a (CoFe)Ti alloy as a function of Ti concentration.

FIG. 8 shows the saturation magnetization of $4\pi M_s$ of $(Fe_{47.9}Co_{52.1})_{100-x}Ti_x$ for values of Ti from 0 to about 20 atomic percent. It can be seen that the curve is very similar to FIG. 2 in that the rate of decrease in the magnetization increases above about 14 atomic percent of Ti and perceptibly so at 15%. In fact, the curve drops faster as it starts at a value above 20 k gauss as compared with 16.5% and the break is perceptible at about 17% in FIG. 2, which is well within the range of experimental error perhaps.

Figure 9:
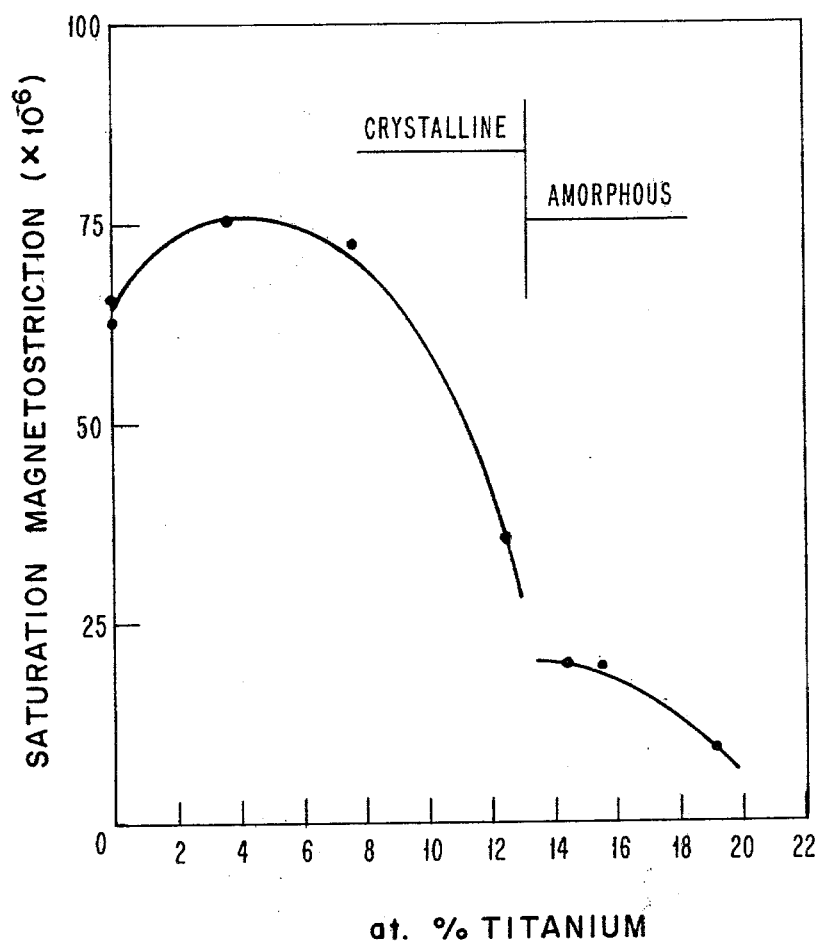
FIG. 9 is a graph of the saturation magnetostriction of the alloy of FIG. 8 as a function of Ti concentration.

FIG. 9 shows a curve of magnetostriction of the same alloy as in FIG. 8 with the obvious radical change in the curve at above about 14 atomic percent Ti in the film. It should be noted that the magnetostriction begins with a definitely larger absolute value, increases unlike FIG. 3 and then drops toward a small positive value below 20 for the amorphous film although it is quite a bit higher than for the CoTi film.

Figure 10:
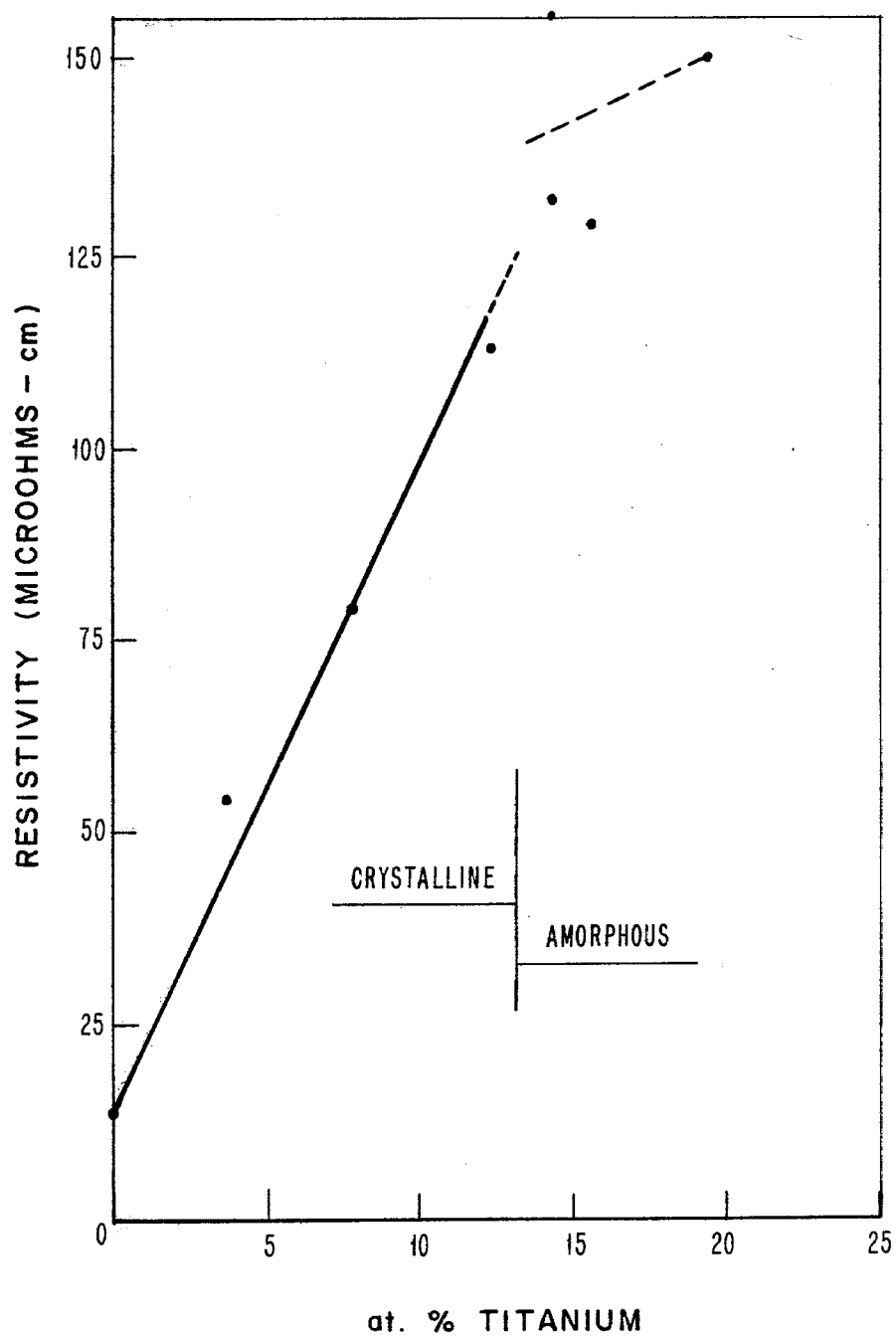
FIG. 10 is a graph of the resistivity of the alloys of FIG. 8 as a function of Ti concentration.

FIG. 10 shows a curve of resistivity at room temperature for the same alloy as in FIG. 8 as a function of Ti concentration with the curve becoming nonlinear above about 14% Ti with a value of resistivity of about 125-150 micro-ohms/cm.

Figure 11:
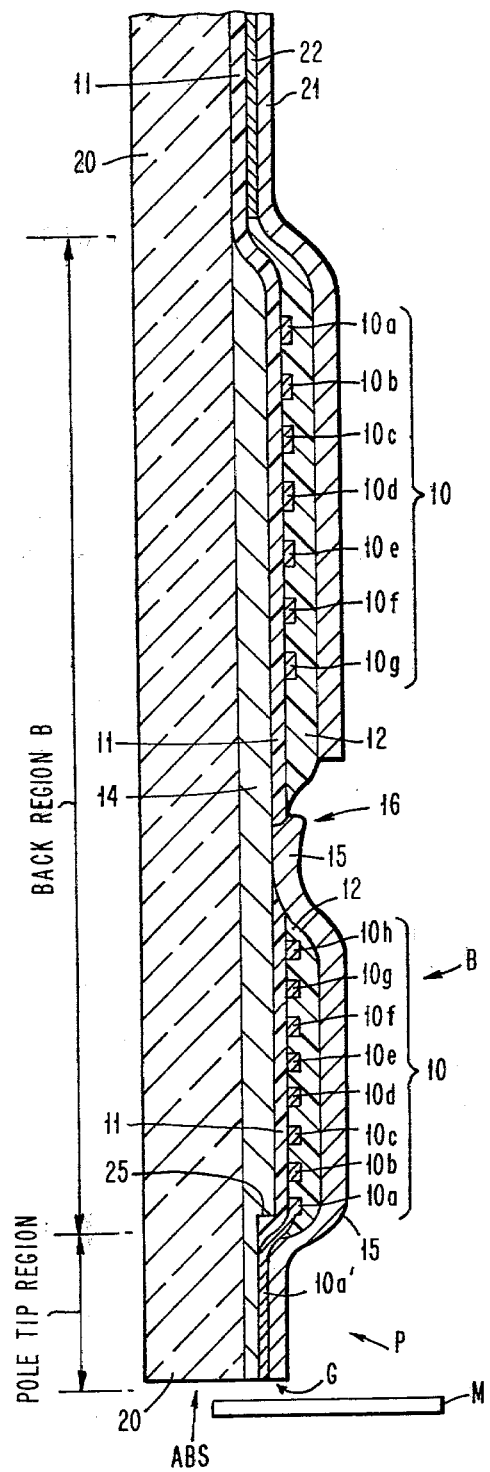
FIG. 11 is a sectional view of a magnetic recording head incorporating the alloys of this invention as a magnetic yoke material.

As illustrated in FIG. 11, a thin film transducer head embodying the invention comprises, briefly, flat conductor coils 10, having a plurality of bifilar turns 10a–h plated in a spiral pattern between two layers 11, 12 of insulating material, forming two electrically separate four-turn windings. This allows for a more balanced electrical center tap than would a single eight-turn spiral provided with a tap at the fourth turn.

A magnetic yoke structure 14, 15 consists of a pole tip region P and a back region B and comprises two magnetic leg layers 14, 15 of a magnetic material, such as amorphous CoTi, CoFeTi, CoNiTi or CoNiFeTi in their magnetic form. Layers 14 and 15 are separated by insulating layers 11 and 12 except (a) at the pole tip region P where they are spaced by a thin conductor layer (turn 10a) of nonmagnetic material (preferably copper) to form a transducing gap.

Layer 10a' is formed as a thinner portion of the layer 10a forming the spiral turns. The end of transducing gap G coincides with an air bearing surface (ABS) formed on a nonmagnetic slider 20 serving as a substrate upon which the abovedescribed layers are deposited. Transducer gap G interacts in air bearing relation with a magnetic recording medium M, such as a rotatable magnetic disk, when the latter rotates and flies closely adjacent the ABS. Medium M is spaced by a distance less than the gap width from the gap G.

The transducer further comprises conductors 21 that reach from electrical contact pads 22, to the central termination pads of coils 10 shown in commonly assigned copending U.S. Patent application Ser. No. 083,182 of Romankiw et al. The outermost turns 10a and 10b of coils 10 terminate in enlarged pad areas 23 which constitute electrical contacts. Members 22 and 23 are connected to external circuitry (not shown) for processing data signals during recording and reading. Yoke structure 14, 15 can be fabricated as described in the above copending application.

In experiments with this sputtering system and Fe and Ti targets, no amorphous alloys could be obtained for the same sputtering conditions up to 25 atomic percent Ti.

It is interesting to note that when silicon was sputtered with transition elements, amorphous alloys could be obtained in the FeSi system, but not in the CoSi system as described in Aboaf, Kobliska and Klokholm, supra.

INDUSTRIAL APPLICABILITY

The alloys of this invention are applicable to such uses as the magnetic yoke material in magnetic recording heads as shown in FIG. 11. Furthermore, they can be used in well known bubble propagation structures such as T-and-I-bar, herringbone, contiguous disc, or the like patterns in magnetic bubble devices. In general, they can be used in transformer to reduce noise because of their low magnetostriction which would tend to reduce the amount of vibration of the laminations. They are also useful in cases in which it is desirable to deposit thin magnetic films which have a minimal tendency to cause stress where it is necessary to protect another layer from being damaged by such stress.

Industry needs an improved magnetic material for use in devices such as inductive magnetic recording heads. Such a material should be suitable for use in a magnetic core structure, should be more corrosion resistant than permalloy and should have a coercivity comparable to that of permalloy. The material should also have a low magnetostriction similar to that of permalloy. As explained above, the amorphous Co-Ti alloys of this invention meet all of the above requirements.

Having thus described our invention, what we claim as new and desire to secure by Letters Patent is:

1. In a cobalt titanium metallic alloy, the improvement consisting of an amorphous metallic alloy having between about 14 and 30 atomic percent of titanium in the alloy, with the remainder of said alloy consisting of cobalt.

2. An amorphous metallic alloy of cobalt and titanium, consisting of between about 14 and 30 atomic percent of titanium and at least 35 atomic percent of cobalt alone plus the remainder of said alloy consisting of transition metals selected from the group consisting of iron and nickel with the amount of cobalt greater than or equal to said iron and nickel.

3. An amorphous alloy in accordance with claim 1, consisting of $Co_{100-z}Ti_z$ where z is between 14 and about 30 atomic percent, and (100−z) is between 86 and 70 atomic percent.

4. An amorphous alloy in accordance with claim 3, wherein the magnetostriction is on the order of $+1\times10^{-6}$.

5. An amorphous alloy in accordance with claim 3 having a saturation magnetization on the order of 11,000 gauss.

6. An amorphous alloy in accordance with claim 3 having a coercivity of less than 1.

7. An amorphous alloy in accordance with claim 3, wherein the film is thermally stable with respect to coercivity up to a temperature of about 400° C. and with respect to saturation anisotropy field up to a temperature of about 450° C.

8. An amorphous alloy in accordance with claim 3, wherein said alloy has a resistivity of about 130 microohm centimeter.

9. A magnetic device including an amorphous alloy consisting of cobalt and titanium, with 14–30 atomic percent of Ti in said alloy.

10. A magnetic memory device in accordance with claim 9, wherein said magnetic recording device comprises a magnetic recording head and said amorphous alloy is employed as a magnetic yoke material.

11. A magnetic memory device in accordance with claim 9, wherein said magnetic memory device comprises a magnetic bubble domain device and said amorphous alloy is employed in the bubble propagation structures.

12. An amorphous metallic alloy consisting of between about 14 and 30 atomic percent of titanium, at least 35 atomic percent of cobalt plus transition metals selected from the group consisting of iron and nickel with the amount of cobalt greater than or equal to said iron and nickel.

13. An amorphous metallic alloy consisting of elements as defined by the formula $(Co_{40+}Fe_xNi_y)_{100-z}Ti_z$ where z is between about 14 and about 30 atomic percent, where x plus y percentages are less than or equal to about 60.

* * * * *